United States Patent
McGaughey

(10) Patent No.: US 10,773,627 B1
(45) Date of Patent: Sep. 15, 2020

(54) SEAT LEVELLING SUPPORT DEVICE

(71) Applicant: Leslie McGaughey, Huntington, TX (US)

(72) Inventor: Leslie McGaughey, Huntington, TX (US)

(*) Notice: Subject to any disclaimer, the term of this patent is extended or adjusted under 35 U.S.C. 154(b) by 114 days.

(21) Appl. No.: 16/170,277

(22) Filed: Oct. 25, 2018

(51) Int. Cl.
 *B60N 3/00* (2006.01)

(52) U.S. Cl.
 CPC .................................. *B60N 3/002* (2013.01)

(58) Field of Classification Search
 CPC ........... B60N 3/00; B60N 3/002; B60N 3/004
 USPC ............. 108/44, 45, 165; 160/24, 25, 84.01; 297/153, 159.1, 158.4, 158.5, 188.01, 297/188.02, 188.12
 See application file for complete search history.

(56) References Cited

U.S. PATENT DOCUMENTS

| | | | | |
|---|---|---|---|---|
| 2,571,574 A * | 10/1951 | Hicks | ................... | B60N 2/6054 297/182 |
| 2,836,229 A * | 5/1958 | Spetner | ..................... | A47C 7/62 297/182 |
| 3,326,446 A * | 6/1967 | Goings | .................. | A47B 31/06 206/563 |
| 4,193,150 A * | 3/1980 | Vineberg | ............. | A47C 20/027 297/DIG. 1 |
| 4,846,382 A * | 7/1989 | Foultner | ................. | B60R 11/00 224/483 |
| 4,948,195 A * | 8/1990 | Saunders | .................. | B60N 2/91 297/182 |
| 5,102,080 A * | 4/1992 | Altieri, Jr. | .............. | B60N 3/103 224/275 |
| 5,365,992 A * | 11/1994 | Swain | ..................... | F24F 13/32 160/84.01 |
| 5,611,287 A | 3/1997 | Begley | | |
| 6,022,072 A * | 2/2000 | Moyer | ..................... | A47C 7/62 248/909 |
| 6,161,901 A * | 12/2000 | Avner | .................... | A47C 5/005 108/165 |
| 6,691,762 B2 * | 2/2004 | Huang | ................... | B60J 1/2091 160/370.22 |
| 243,782 A1 | 11/2006 | Dewolfe | | |
| D561,564 S * | 2/2008 | Larsen | .......................... | D8/355 |
| 7,481,169 B2 * | 1/2009 | Larson | .................. | B60N 3/002 108/44 |
| 7,992,502 B1 * | 8/2011 | Davis | ..................... | A47B 23/04 108/43 |
| 8,794,162 B2 * | 8/2014 | Hisata | ................... | B64D 11/00 108/43 |
| 10,464,748 B2 * | 11/2019 | Akerberg | ............... | A47B 13/08 |

* cited by examiner

*Primary Examiner* — Jose V Chen
(74) *Attorney, Agent, or Firm* — Sanchelima & Associates, P.A.; Christian Sanchelima; Jesus Sanchelima

(57) ABSTRACT

The present invention relates to a seat levelling support device for providing a substantially flat surface to support at least one item thereon. The device is for use in vehicle seats. The device includes a spring which has a substantially flat top edge and a contoured bottom edge configured to conform with the contours of the vehicle seat. The spring has a collapsible configuration, wherein in the extended configuration of the device, the top edges of the spring define a substantially flat surface for supporting things thereon.

7 Claims, 6 Drawing Sheets

SEAT LEVELLING SUPPORT DEVICE

BACKGROUND OF THE INVENTION

1. Field of the Invention

The present disclosure relates to a support device. In particular, the present disclosure relates to a support device to be used on a vehicle seat.

2. Description of the Related Art

The seats of the car generally have an inclined configuration for providing maximum comfort to the occupants. However, such a configuration of the seat is not ideal for holding things which need to be held on a substantially horizontal surface such as soft drink containers or pizza boxes. Hence, there is felt a need for a device that provides a substantially horizontal surface to support things thereon, when placed on a vehicle seat.

Several designs for such levelling devices have been designed in the past. None of them, however, are known to be easily storable or reusable or having a compact configuration.

Applicant believes that a related reference corresponds to U.S. Patent Publication No. 20060243782 filed by GARY DEWOLFE. The DeWolfe reference discloses a leveling flap is positioned along the bottom of a pizza box. The leveling flap can be positioned so that it extends from the bottom of the pizza box. However, the DeWolfe reference fails to disclose a levelling device that is easily storable or reusable. The size of the box itself makes it impossible to store in smaller car cabin compartments such as the glove box and the like.

Another related application is U.S. Pat. No. 5,611,287 filed by STEVEN M. BEGLEY. The Begley reference discloses a levelling device formed from a single sheet of foldable material which is used to convert an automobile seat into a flat, horizontal surface. However, the Begley reference fails to a levelling device that is easily storable or reusable.

Other documents describing the closest subject matter provide for a number of more or less complicated features that fail to solve the problem in an efficient and economical way. None of these patents suggest the novel features of the present invention.

SUMMARY OF THE INVENTION

It is an object of the present invention to provide a levelling device to be disposed on an inclined and angled vehicle seat for providing a substantially horizontal surface for supporting things thereon.

It is yet another object of the present invention to provide a levelling device that has a compact configuration, which makes it easily storable in car cabin compartments such as the glove box.

Further objects of the invention will be brought out in the following part of the specification, wherein detailed description is for the purpose of fully disclosing the invention without placing any limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE EMBODIMENTS OF THE INVENTION

Figure 1:
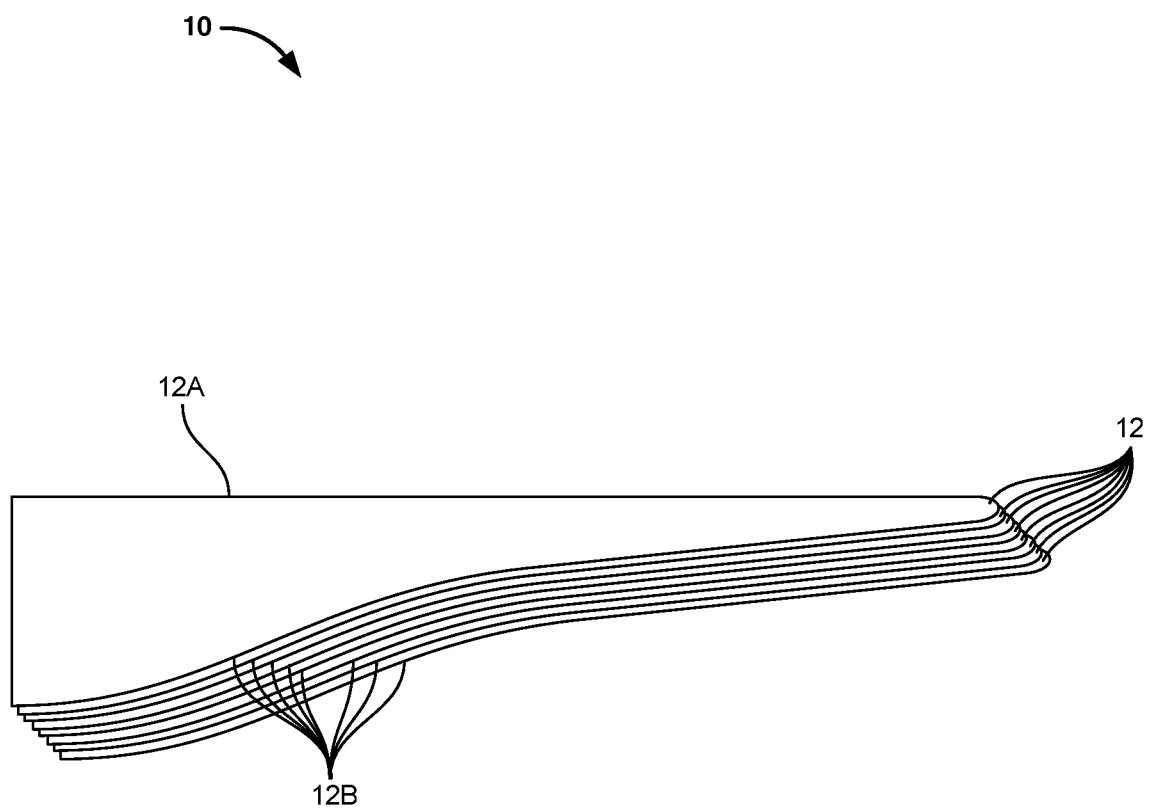
FIG. 1 represents a side view of a seat levelling support device 10, which includes one continuous spring 12.
Figure 2:
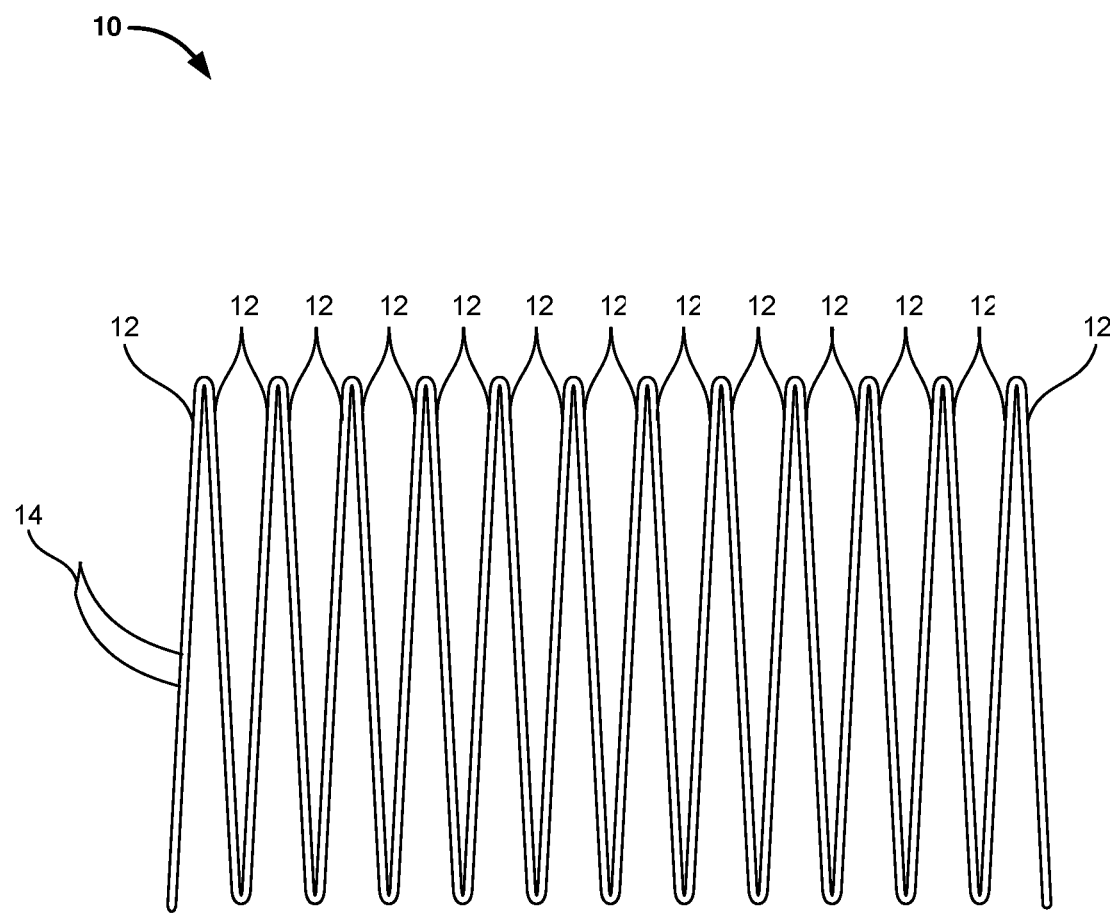
FIG. 2 illustrates a top view of the seat levelling support device 10, wherein the device 10 is in its extended configuration.
Figure 3:
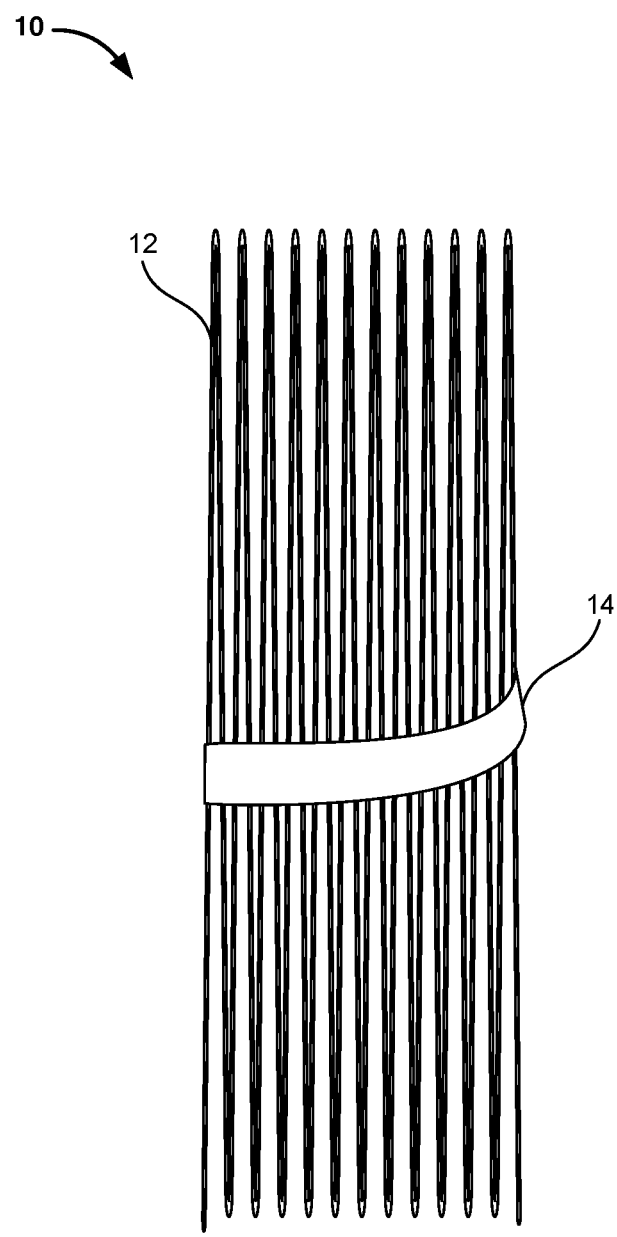
FIG. 3 illustrates another top view of the device 10, wherein the device 10 is in its collapsed configuration and the spring 12 is stacked together by the strap 14.
Figure 4:
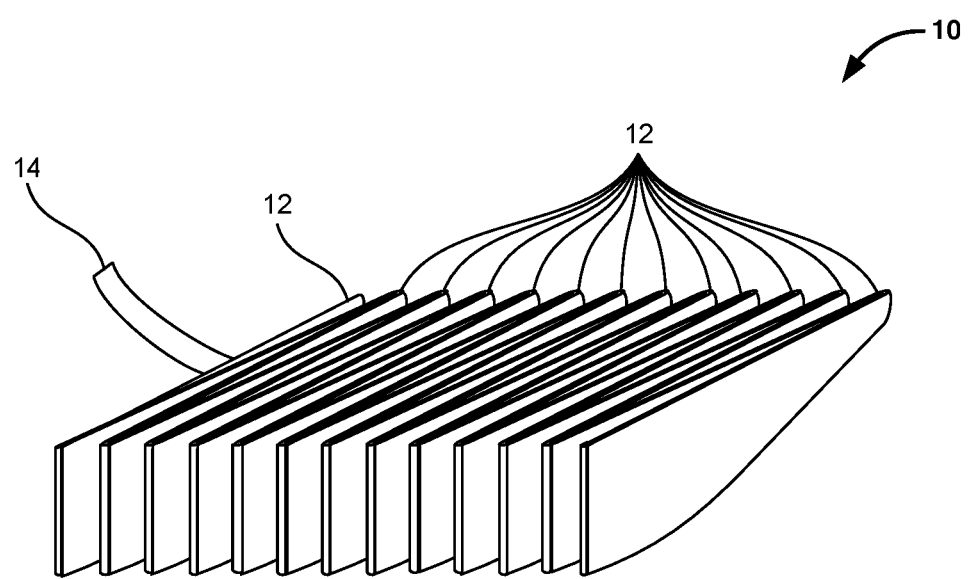
FIG. 4 illustrates an isometric view of the device 10, wherein the device 10 is in its extended configuration.

Referring now to FIGS. 1-4, where the present invention is generally referred to with numeral 10, it can be observed that seat levelling device 10 (hereinafter also referred to as device 10) comprises a continuous spring 12. The spring 12 has a configuration similar to that of collapsible bellows. In an exemplary embodiment, the spring 12 is made of spring steel. The configuration of the spring 12 makes it possible to use the device 10 after extending spring 12. The extended configuration of the device 10 can be seen in FIGS. 2 and 4.

In the extended configuration, the operative top edges 12A of the spring 12, which have a substantially horizontal configuration, define the substantially flat surface. The operative bottom edges 12B of the spring 12 have a contoured profile configured to conform with the contours of the vehicle seat. Therefore, the device 10 can be placed on the vehicle seat in a manner that it snugly fits with the contours of the vehicle seat, while the top edge of the spring 12 provides the flat surface required to support things thereon.

Furthermore, the configuration of the device 10, as explained above also provides the device 10 with collapsible properties. More specifically, after the use of the device 10 is done with, the device 10 can be collapsed by pressing together the spring 12. The collapsed configuration of the device 10 can be seen in FIG. 3.

The device 10 further comprises a hook and loop strap 14. The strap 14 is used for stacking the spring 12 in the collapsed configuration of the device 10, wherein in the collapsed configuration, the spring 12 pressed together, thereby reducing the size of the device 10 relative to its size in its extended configuration. This allows the device 10 to be stored in compact compartments of the car cabin, e.g., the glove compartment.

Figure 5:
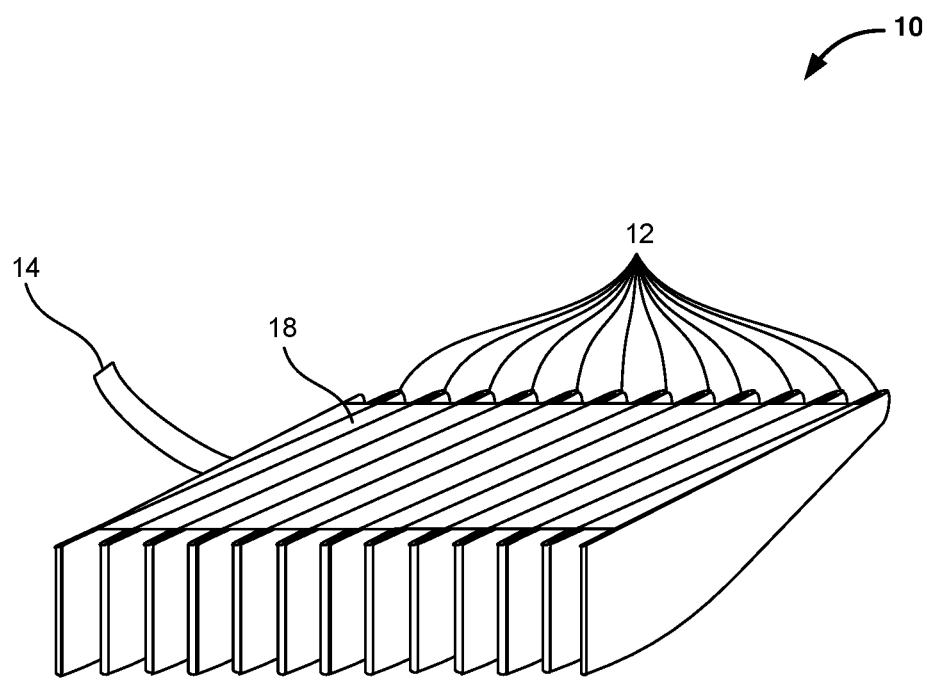
FIG. 5 illustrates an isometric view of the device 10, in accordance with another embodiment, wherein the device 10 includes a rubber grip cover 18 covering the spring 12.

Another feature of the embodiment is illustrated in FIG. 5. As seen in FIG. 5, the device 10 includes a rubber grip cover 18 provided on the operative top edges of the spring 12. The advantage of the rubber grip cover 18 is that it increases the utility of the device 10 from just being a levelling device to a writing support as well. More specifically, the rubber grip cover 12 will provide a firm surface in the extended configuration of the device 10, as illustrated in FIG. 5, to allow a person to use the device 10 as support surface for writing.

Figure 6:
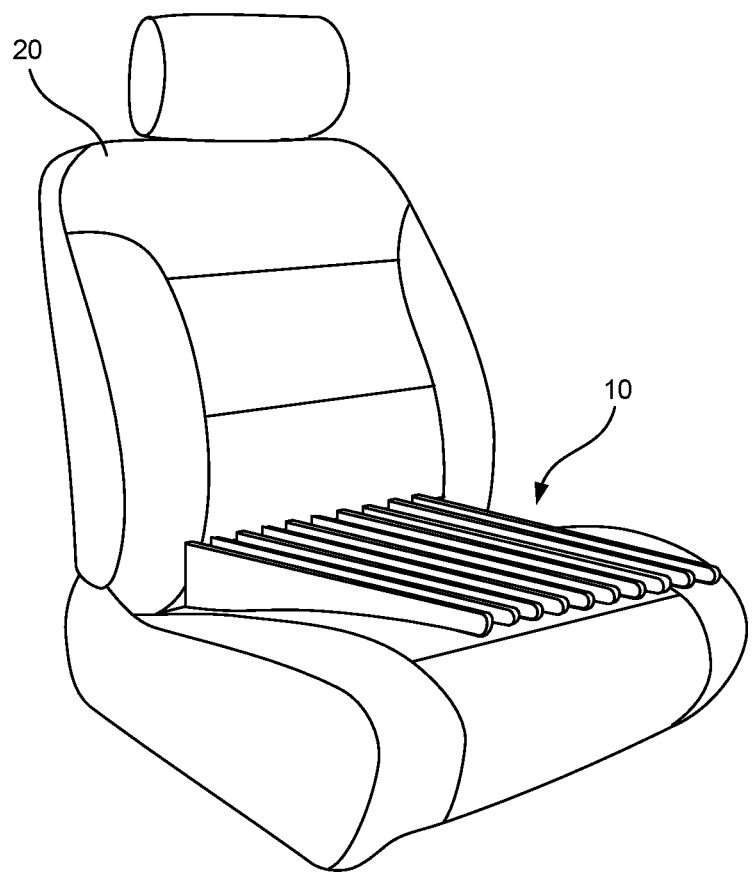
FIG. 6 illustrates an isometric view of a vehicle seat 20 on which the device 10 is placed.

FIG. 6 illustrates an isometric view of the device 10 being placed on the vehicle seat 20. As seen in FIG. 6, after placing the device 10 on the seat 20, the device 10 snugly fits on the seat 20, wherein the contours of the bottom edge of the spring 12 of the device 10 conform with the contours of the vehicle seat. As such, a substantially flat surface is provided on the top edge of the device 10 to support things such as pizza boxes, soft drink containers, and the like thereon.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A seat levelling support device for providing a substantially flat surface to support at least one item thereon, a structure comprising a spring having operative top edges which can be extended to define a flat surface, wherein an operative top edge of the spring is substantially horizontal, and an operative bottom edge of the spring has a contoured profile that conforms with contours of a vehicle seat.

2. The device as claimed in claim 1, wherein the spring has an integral configuration.

3. The device as claimed in claim 1, wherein the device has a collapsible configuration.

4. The device as claimed in claim 1, further comprising a strap for stacking the spring in the collapsed configuration, thereby reducing the size of the device relative to the size of the device in its extended configuration.

5. The device as claimed in claim 4, wherein the strap is a hook and loop strap.

6. A seat levelling support device for providing a substantially flat surface to support at least one item thereon, a structure comprising a spring having operative top edges which can be extended to define a flat surface, wherein:

a. the operative top edge of the spring is substantially horizontal, and an operative bottom edge of the spring has a contoured profile that conforms with contours of a vehicle seat; and b. a strap is provided on the device for stacking the spring in a collapsed configuration of the device, thereby reducing a size of the device relative to the size of the device in its extended configuration.

7. The device as claimed in claim 6, wherein the strap is a hook and loop strap.

\* \* \* \* \*